United States Patent [19]
Wagenblast et al.

[11] 3,731,829
[45] May 8, 1973

[54] CONTAINER-VEHICLE ASSEMBLY

[75] Inventors: Ernst Wagenblast, Singen; Heinz Hohlwegler, Gottmadingen; Siegfried Schaible, Singen, all of Germany

[73] Assignee: Maschinenfabrik Fahr Aktiengesellschaft, Gottmadingen, Germany

[22] Filed: Nov. 19, 1971

[21] Appl. No.: 200,329

[30] Foreign Application Priority Data

Nov. 23, 1970 Germany..................P 20 57 567.1

[52] U.S. Cl. ..................214/390, 214/314, 214/512
[51] Int. Cl. ............................B65g 7/00, B60p 1/64
[58] Field of Search......................214/390, 502, 512, 214/314; 298/11; 254/122

[56] References Cited

UNITED STATES PATENTS 3,378,155  4/1968  Steiner ................................214/390
3,468,440  9/1969  Poole ...................................214/390

Primary Examiner—Albert J. Makay
Attorney—Karl F. Ross

[57] ABSTRACT

A container-vehicle assembly in which a bifurcated trailer adapted to be towed by an agricultural vehicle of the like has, along the parallel shanks of the trailer body, a pair of vertically extendible and retractable scissor linkages adapted to support a container. A hydraulic drive raises and lowers the linkage and a simplified latch secures the container against undesired release. The latch is provided with a swingable latch plate whose recess engages a bolt or pin of the container while a locking pawl retains the latch plate in its locked position or draws a latch plate downwardly to release the bolt when a cable is tightened during movement of the linkage.

10 Claims, 12 Drawing Figures

Patented May 8, 1973 3,731,829

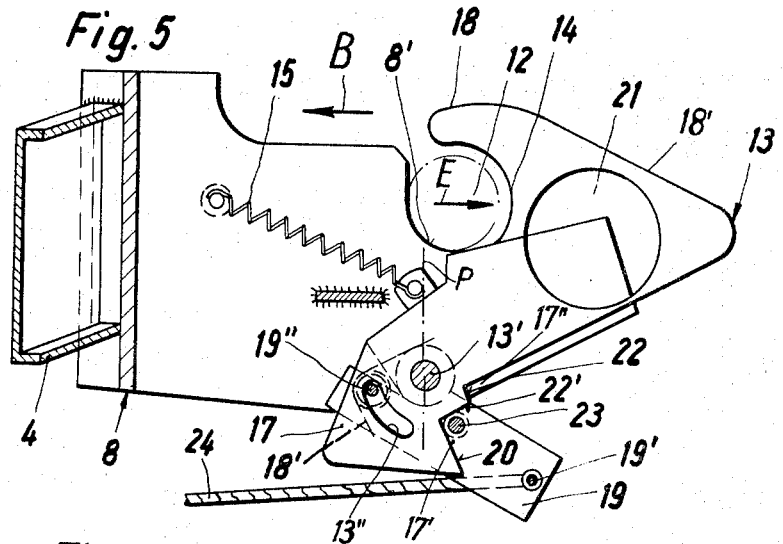
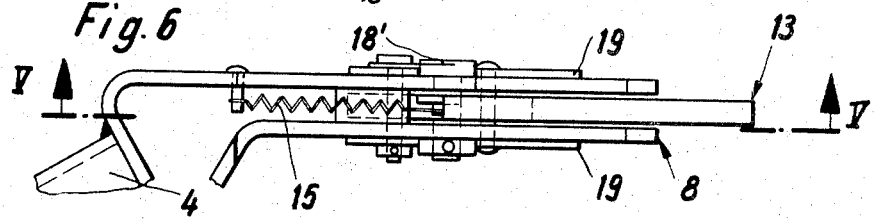
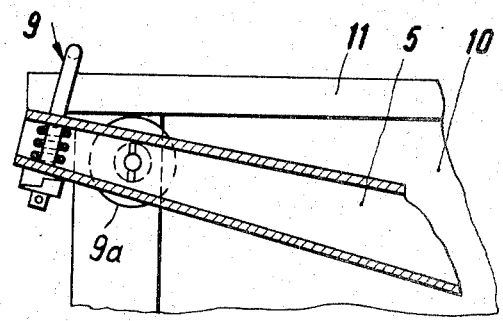
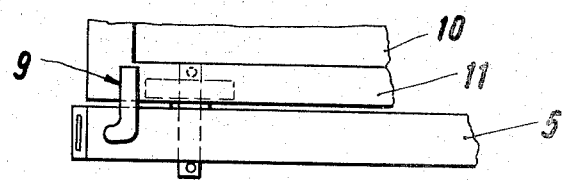

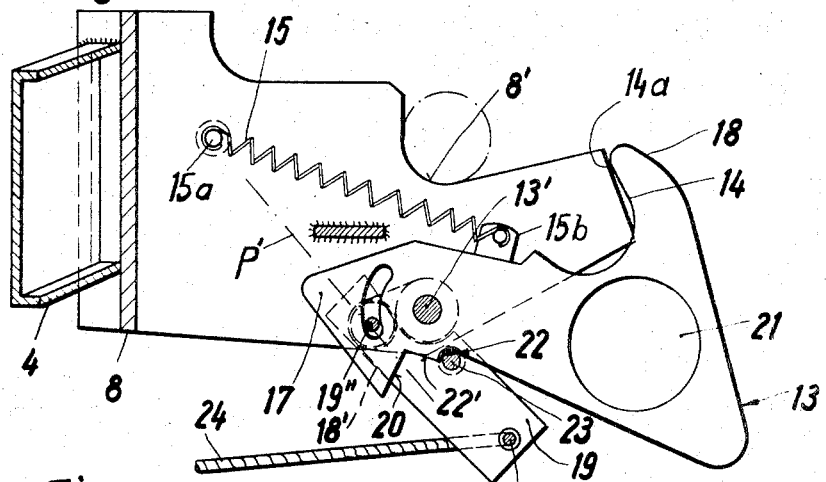
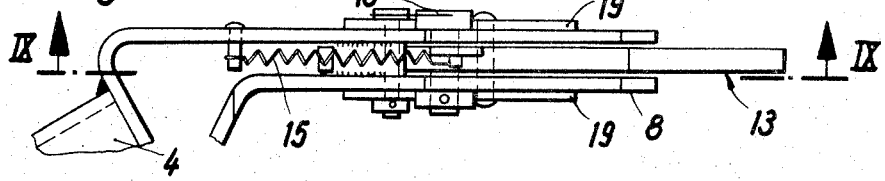
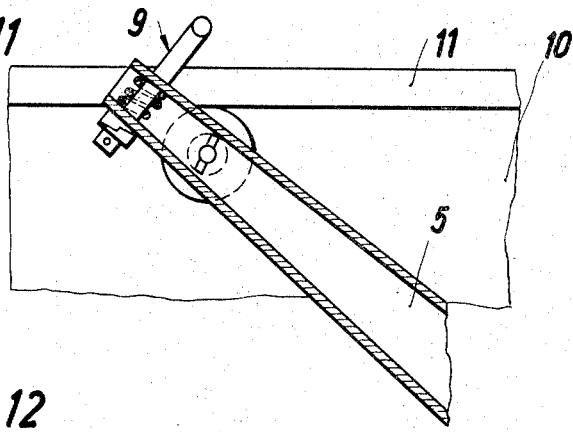
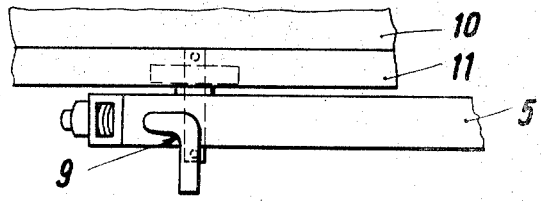

CONTAINER-VEHICLE ASSEMBLY

CROSS-REFERENCE TO RELATED APPLICATIONS

This application is related to application Ser. No. 6,448, now U.S. Pat. No. 3,637,098, filed 28 Jan. 1970 by two of us. The application is also related to copending application Ser. No. 6,458, now U.S. Pat. No. 3,656,644, filed 28 January 1970.

FIELD OF THE INVENTION

The present invention relates to container-trailer combinations and, more particularly, to agricultural and other vehicles having a container-accommodating trailer which can engage a container for removing the same from a stack, placing a container upon a stack, transporting the container, and tipping a container to dump its contents. More particularly, the invention relates to a trailer adapted to be towed by a tractor or other agricultural vehicle and provided with means for releasably locking a container on the trailer.

BACKGROUND OF THE INVENTION

In the copending application Ser. No. 6,448, mentioned earlier, there is disclosed and claimed a vehicle comprising a bifurcated frame, a pair of scissor-type linkages mounted on respective beams along the shanks of the frame, and catch means at the upper ends of the scissor linkages for engaging, retaining and releasing a container adapted to rest upon the scissor linkages. The scissor linkages had the upper ends of the links interconnected by relatively massive bars and thus were bulky, of expensive construction and of a greater weight than was desirable. The same held true of the system described in application Ser. No. 6,458. In this application, there was provided a vehicle for transporting containers with a bifurcate frame with a pair of parallel generally horizontal bars forming the shanks or legs thereof and provided at the free ends of these shanks with wheels adapted to roll along the ground. On these bars were articulated hydraulically operable scissor linkages which could be raised and lowered together with a container whose rim overhung the bars. The bars at the upper end of the scissor linkages carried pivoted latches to hook onto lateral projections on the container when the beams were elevated by the extended linkages. A collapse of the linkages to lower the bars released the latch by retraction thereof into an inoperative position.

Even in the latter case, a bar was required to connect the upper ends of the links forming each scissor linkage, thereby increasing the weight of the system.

Prior to the arrangement described in the aforementioned apparatus, container-supporting structures were provided with gantry or boom-like elevating structures engageable with trunnions of the container for raising and lowering same. These systems were not amenable to use upon trailers and like vehicles and were not adapted to most farm uses.

OBJECTS OF THE INVENTION

It is the principal object of the present invention to provide an improved container-transport system in which the aforementioned disadvantages are obviated.

It is another object of the invention to provide a vehicle for transporting containers having an automatically and/or manually operable latch of simplified construction and requiring smaller mass than earlier systems for similar purposes.

It is yet another object of the invention to provide an improved latch arrangement for a vehicle of the character described.

Yet a further object of the invention is to provide an agricultural or like vehicle for the transportation, stacking or dumping of containers, which is space-saving, relatively lightweight and capable of engaging and releasing the containers without upper bars or beams connecting the links of a scissor linkage.

SUMMARY OF THE INVENTION

These objects are attained, in accordance with the invention, with an agricultural container-transport vehicle which comprises a bifurcated trailer structure at the end of the shanks or prongs of which are provided ground-engaging wheels while the bight of the U is formed with a tongue adapted to attach the trailer to a tow bar or the like of an agricultural tractor.

In accordance with the principles set forth in the earlier applications mentioned above, each pair, prong or limb of the U-shaped frame forming the trailer chassis is provided with a scissor linkage consisting of at least two intersecting links whose lower ends are swingable relative to the limb of the chassis and at least one of which is longitudinally shiftable relatively thereto. Similarly, the upper ends of the links, which are hinged together at intermediate locations along their lengths are provided with means including an automatically releasable and engageable catch, for supporting a container having a laterally projecting rim and in a swingable manner, at least one of the upper ends of each scissor linkage being longitudinally shiftable relative to the container whereby the container can be raised and lowered.

In this manner, it is possible to embrace a container, or stack thereof, resting upon the ground by backing the vehicle chassis around this container or stack, to raise the linkage beneath the laterally projecting rim and thereby raise a container from the ground or from a stack thereof, and transport the lifted container. Conversely, a container carried by the vehicle may be lowered to the ground or onto a stack. The catch retains the container against rearward movement and a hydraulic jack or other power means may be used to elevate or contract the linkage.

According to the present invention, the upper end of one of the links of each scissor linkage is provided with a catch having a catch plate adapted to receive a lateral projection or pin of the container and a latch lever swingable to enclose the pin and fulcrumed onto the plate, the latch lever preventing withdrawal of the pin in the longitudinal direction from the recess or cradle of the catch plate when the lever is in its "closed" position. The fulcrum of the latching member is located below the cradle and the latching lever is provided with a locking member automatically controlled by the position of the links of the scissor linkage to enable opening of the latch lever or for retaining the latter in its open condition against the force of a tension spring normally tending to draw it into the closed position. The locking member is preferably a lever fulcrumed on the support or catch plate and having intermediate the fulcrum and the point of attack of the automatic operating means, a pin engageable with the flanks of a pair of notches formed in the latch at a side thereof opposite the recess engaging the container pin.

The other link of each scissor linkage at its upper end according to the present invention is provided with a roller engageable beneath the laterally projecting rim and a swingable hold-down member which, in one position, overhangs this rim while in its other position permits the container to clear.

In other words, at the upper end of the corresponding links of the scissor linkages is provided a catch plate adapted to receive the laterally projecting pins of the container and supporting the same from below, and a latch pivotally mounted on each support plate for swinging movement about a pivot axis located below the pin when the latter is fully ensconced in the cradle formed by the latch plate, the latch being biased in a "-catch-closing" sense by a spring. A tension member, e.g. a cable, band or chain, is connected between the other link of the scissor linkage and a locking pawl whose pin, in turn, can be shifted from one side of the fulcrum to the other past a deadline position so that the distance between the bottom of the cradle and this pin is decreased and the locking pin located directly below the support pin of the container so that the latch cannot be deflected into its open condition even on this opposite side of the dead-center position.

An important feature of this invention resides in the connection of the cable or operating means between a tie point on the locking pawl or lever and a portion of the other link of the scissor linkage such that the distance between the tie point on this other link and the catch is increased when the container is to be released or picked up.

According to another feature of the invention, the latch mechanism is operable by hand and the automatic hold-down device is similarly operable by hand to release the container when desired. For example, the hold-down device may be an inverted L-member whose long leg is rotatably mounted in the free end of the "other" link and whose short leg can be swung from a position in which it overlies the laterally projecting rim of the container into a position in which it frees the container. Furthermore, the flanks of the notches of the latch, which may be engaged by the pin of the locking pawl, may include a first flank extending radially with respect to the fulcrum of the latch and adapted to be drawn forwardly to release the container pin by a displacement of the linkage tending to draw the cable forwardly. In a second position, with the pawl in a rearward condition, the pin may engage a second flank, perpendicular to the first and generally parallel to the surface of the latch lever engaging the container pin. This second flank may lie on the same side of the latch fulcrumed as the container pin with respect to a vertical plane through this fulcrum. Finally, the notches may define a third flank, also engageable by the pawl pin in an extreme position following displacement of the latch lever counter to the spring force, for retaining the latch lever in its open position. In this case, the pin of the pawl and the spring act on opposite sides of the fulcrum, but the third flank is so oriented that the spring alone cannot release the latch. This can be accomplished by locating the pin of the pawl on the same side of the pawl fulcrum as the point of attack of the latch thereon. The pin of the pawl thus acts both as an entraining member for releasing the latch and as a locking member for securing it in its open and closed positions.

DESCRIPTION OF THE DRAWING

The above and other objects, features and advantages of the present invention will become more readily apparent from the following description reference being made to the accompanying drawing in which:

FIG. 5 is a side-elevational view of the latch of FIG. 2 in the locking position, the view being taken in cross Section along the line V — V of FIG. 6;

FIG. 6 is a top view of the latch mechanism shoWn in FIG. 5;

FIG. 7 is a view similar to FIG. 3 but showing the hold-down device in engagement with the container;

FIG. 8 is a view similar to FIG. 4 but illustrating the hold-down device in the position of FIG. 7;

FIG. 9 is a side-elevational view taken in section along the line IX — IX of FIG. 10 illustrating the latch mechanism in its position designed to permit release of the container during stacking;

FIG. 10 is a top view of the mechanism of FIG. 9;

FIG. 11 is a view similar to FIG. 7 showing the hold-down device after it has been released from the container; and FIG. 12 is a top view of the hold-down device in the last-mentioned position.

SPECIFIC DESCRIPTION

Figure 1:
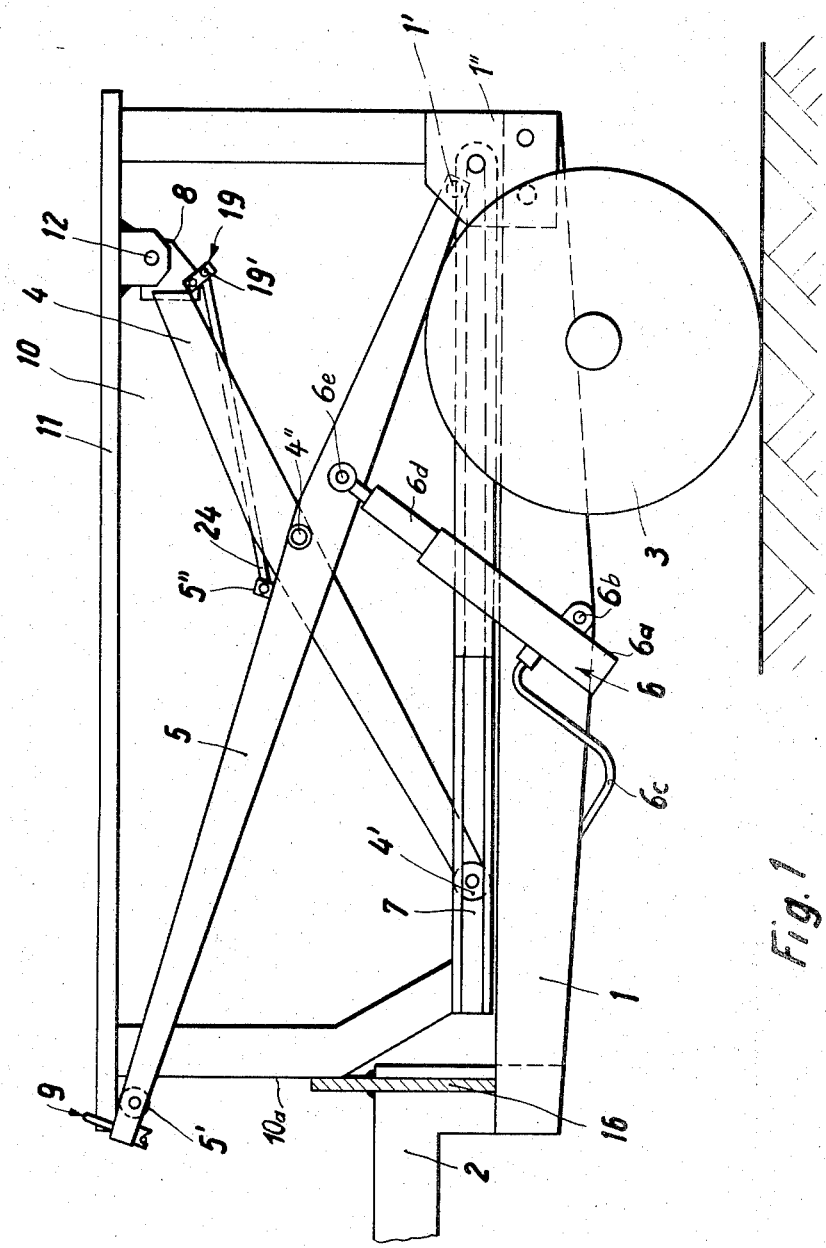
FIG. 1 is a side-elevational view, partly in diagrammatic form and partly in cross section of a vehicle carrying a container, in accordance with the present invention, the container and linkage being illustrated in the transport position.
Figure 2:
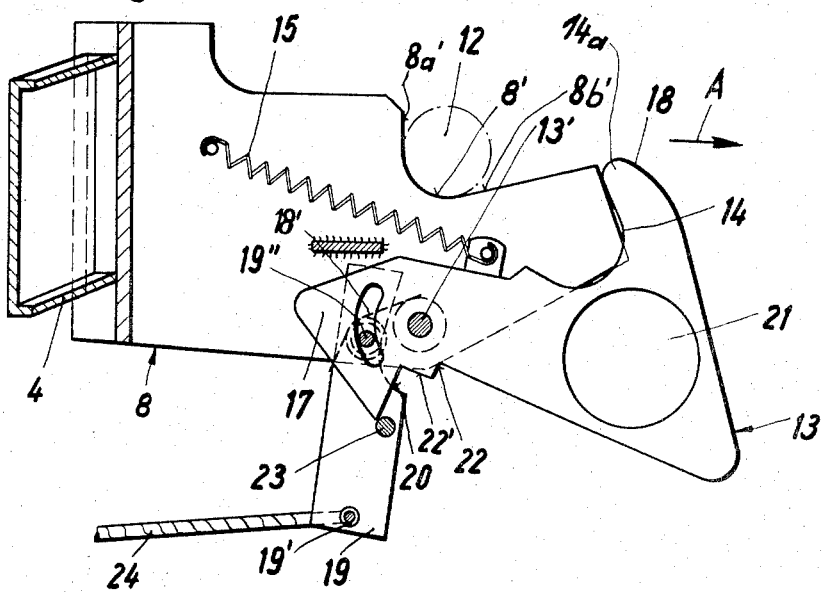
FIG. 2 is a side view, partly broken away, of a container latch in its open position, the latch being drawn to a considerable enlarged scale in comparison with FIG. 1.
Figure 3:
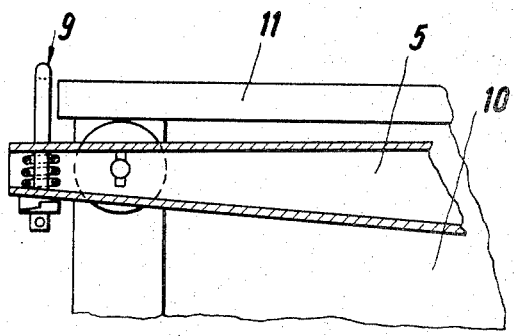
FIG. 3 is a vertical section through a portion of one of the scissor linkages of the system illustrating the hold-down device of the present invention.
Figure 4:
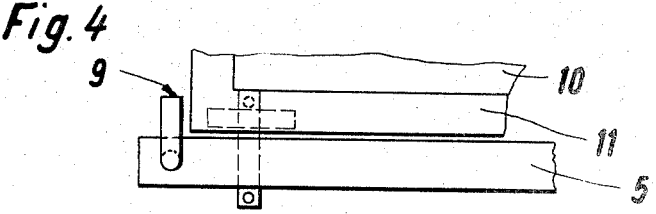
FIG. 4 is a plan view of the hold-down device.

In the drawing, we have shown an agricultural container-transporting vehicle which comprises a U-shaped or bifurcated frame 1 whose forward end is provided with a towing tongue adapted to be articulated to a tow bar of an agricultural tractor intended to displace the vehicle along the ground. The frame 1 is fork-shaped and the free ends of the two fork limbs or shanks are provided with respective wheels 3, preferably on the outside of each limb so that the vehicle may be backed past the container 11 standing on the ground.

Each limb of the frame 1 carries a respective scissor linkage formed by two intersecting links 4 and 5 which are pivotally connected at 4'' and which are displaceable by an associated hydraulic jack represented generally at 6.

The hydraulic jack 6 may comprise a culinder 6a articulated at 6b to the limb of the trailer fork 1 and connected by a conduit 6c to the hydraulic output of the tractor. The piston 6d of the jack is, in turn, hinged at 6e to the link 5.

The lower ends of the links 4 and 5 are articulatedly connected to the fork-shaped frame limbs with at least one of its lower ends being longitudinally displaceable as well. Hence the lower ends of the links 4 and 5 allow a hinging displacement relative to the frame and a longitudinal displacement of at least one limb. To this end, the free end of the respective limb of frame 1 is provided with a support plate 1'' to which the lower end of link 5 is articulated at 1'. The lower end of link 4 is formed with a roller 4' which rides in a longitudinally extending laterally open channel or beam 7 fixed to the frame 1. Thus, when the jack 6 elevates the linkage, the link 5 is swung in a clockwise sense about its pivot 1' while link 4 is swung in the counterclockwise sense about its pivot 4' while the pivot 4' shifts to the right along the channel. The spacing between the free ends of the links 4 and 5 at both the upper side and the lower side of the linkage is thus reduced.

The upper end of link 4 (which extends rearwardly and upwardly from the vehicle frame 1) is provided with a latch-support plate generally represented at 8 and engageable with a lateral projection or pin 12 of the container 10 which is accommodated between the linkages. The forwardly and upwardly extending free end of link 5 is provided with a hold-down bail or finger 9 which, in an inwardly turned position, can bear upon the upper surface of the outwardly turned edge or laterally projecting rim 11 of the container. The underside of this laterally projecting rim may be engaged by roller 5'.

The latch structure better seen in FIGS. 2, 5, 6, 9 and 10 comprises a latch lever 13 of the double-arm type which is fulcrumed at 13' to the support 8. The support is provided with a recess 8' in the form of an upwardly opening cradle whose flank 8a' extends generally vertically while the other flank 8b' runs at a slight upward and rearward angle. It will be apparent that this configuration of the cradle 8' permits introduction of the pin 12 by movement of the latch arrangement 8 etc. rearwardly in the direction of arrow A. The latch lever 13 is formed with a substantially semi-circular recess 14 opening in the forward direction (arrow B) and having a finger 14a adapted to overhang the pin 12 to prevent its withdrawal from the cradle in the upward direction. The cradle and the recess 14 together surround the pin 12 over most of its periphery. A tension spring 15, anchored at 15a to the support plate, engages the lock 15b on the latch lever 15 and normally biases the latch lever 13 in the counterclockwise sense about its fulcrum or pivot 13'. As shown in FIG. 5, moreover, the latch lever 13 is shaped to provide a ramp 18' terminating in an arcuate guide surface 18 (FIG. 2) along which the pin 12 can be guided into the cradle 8'. During this movement, the pin 12 may cam the latch lever 13 in the clockwise sense against the force of spring 15 to open the latch.

An abutment 16 is provided at the front end of the frame 1 for engagement with the front face 10a of the container to position the latter properly with respect to the latch. Thus, when the latch lever 13 is engaged (FIG. 5) it retains the container against rearward movement with respect to the linkage while the abutment 16 prevents forward movement of the container relative to the frame.

The latch lever 13, which is fulcrumed about the pivot 13', has the configuration of a double-arm or bellcrank lever whose short arm 17 constitutes the control or actuated arm while the other arm of the lever is hook-shaped to provide the aforementioned recess 14 for engagement with the container pin 12. The lever is provided further with a bore 21 to reduce its weight.

The control arm 17 if formed with a pair of notches 17' and 17'' having at least three flanks to be described in greater detail hereinafter. The first flank 20 which constitutes an edge of the lever extending radially with respect to the pivotal axis 13, is engageable by a pawl pin 23 of a locking and actuating pawl 19 forming a second-order lever. The pawl 19 is fulcrumed at 19'' to a pin which is received in a slot 13'' of the main latch lever. The pawl 19 is actuated by a cable 24 whose tie point to the pawl 19 is shown at 19' and which is connected to the other link 5 at its lug 5'' as illustrated in FIG. 1. The pawl 19 is constituted as a double strap, the sides of which may be interconnected by the cable 24 and rivet forming the pin 23. In other words, the pin 23 is simultaneously an entraining pin, a locking pin and a spacer between the plates of the double-shackle pawl 19.

The second flank 22' of the notch 17' extends perpendicularly to the flank 20 and hence is perpendicular to the radius from fulcrum 13' mentioned earlier. When the pin 23 rests beneath this flank, both the pin and the point of attach of the container pin 12 lie on the same side of the fulcrum axis 13' with respect to vertical plane P. Since the downward force of the container is supported by the cradle surface 8b', the weight of the container cannot act to swing the latch out of its closed position (FIG. 5). Furthermore, any rearward movement of the container must cause the pin 12 to ride relatively upwardly along the flank 8b' (arrow E) and bear upon the latch lever 13 in the direction represented by this arrow. The overhanging portion 18 of the hook, however, prevents a component of motion of the lever 13 downwardly in the position shown in FIG. 5 when the pin 12 bears upon it. Consequently, the latch is self-locking and the pin 23 need not absorb much force. It merely needs prevent the latch from slipping downwardly when opening of the latch is not desired when the pin 12 is fully in its cradle. The other flank 22 of the notches is engaged by the pin 23 when the lever 13 is mutually swung in the clockwise sense the upper portion 14a of the recess having the fulcrum 13' as its center of curvature. In this position, the pin 23 rests against the surface 22 above the fulcrum 19'' insofar as the dead-center position represented by plane P' is concerned. The lever 13 is thus prevented from swinging in the counterclockwise sense.

The hold-down device 9 (FIGS. 3, 4, 7, 8, 11 and 12) comprises an L-shaped steel bar with short and long legs forming an angle of 90° with one another. The long leg is rotatable in scissor link 5 against a spring-controlled resistance to prevent slipping. The short leg can overhang the laterally projecting rim of the container 10 in one position and can clear it in another.

The system illustrated herein operates as follows: In the contracted state of the scissor linkages 4, 5, the tie point 5'' shifts to the left relative to the catch assembly 8, etc., thereby causing the cable 24 to rotate the pawl 19 in a clockwise sense about its fulcrum 19'' and bring the pin 23 to bear against edge 20. The latch 13 is thereby rotated in the clockwise sense to open the catch and generate the position shown in FIG. 2. The latch lever 13 is here in it open or disengaged position. While the spring 15 tends to swing the latch 13 in a counterclockwise direction, this tendency is resisted by the wire 24.

The fork-shaped frame 1 of the vehicle can then be backed around a container 10 seated upon the ground. In this position, the lowered links 4 and 5 on both sides of the container lie below the laterally projecting rim 11 of the container. As soon as the abutment plate 16 comes to rest against the container 10 and the latch 8, etc. lies below the pin 12 of container 10, hydraulic jack 6 is to raise the scissor linkages and lift the container 10. The resulting reduction in the distance between the tie point 19' and the tie point 5'' of cable 24 releases the latch 13 and permits the latter to swing under the force of spring 15 in the counterclockwise sense about is pivot 13' and ensconce the pin 12 in the cradle 8' and recess 12. Since the outer end of recess 14 has the form of a circular arc with a center at fulcrum 13', the pin 12 and the condenser 10 are automatically locked in a self-securing manner. In other words, any force applied by the pin 12 to the latch 13 has a component resisting opening of the latch. All of the forces applied by the container to the catch are thus translated directly or indirectly to a force upon the support plate 8. When the container 10 is seated upon the ground, the movements reverse and the latch is automatically opened to release the container.

It will be apparent from the transition between FIGS. 3, 4 and FIGS. 5, 8, that during the elevational movement of the scissor linkages 4, 5, the free end of FIG. 5 tends to move to the right relative to the container rim 11 which rests upon the roller 9a. The rim passes between this roller and the inwardly turned short leg of the hold-down device 9.

To secure the container independently of the movement of the links 4 and 5, e.g. by hand, when the containers are to be stacked, the latch 13 is rotated in the clockwise sense by hand until the pin 23 can engage the flank 22, the cable 24 being in a relaxed condition when the scissor linkages are elevated. The pawl 19, of course, is swung against the force of spring 18' in the counterclockwise sense for this positioning of pin 23. Again, a self-locking retention of the latch lever is obtained. The hold-down device 9 can then simply be rotated outwardly (FIGS. 11 and 12) to disengage the container. It should be noted that release of the latch is possible from the position illustrated in FIGS. 9 and 10, simply by swinging the lever 13 somewhat further in the clockwise direction, whereupon spring 18' draws the pawl 19 in the counterclockwise direction into the position shown in FIG. 5.

We claim:

1. In a vehicle for the transport, stacking and elevating of a container, in combination:
    a. a bifurcated vehicle chassis having a pair of limbs extending in the direction of movement of said vehicle and provided with ground-engaging wheels;
    b. respective vertically extendible and retractable assemblies mounted on each of said limbs, each of said assemblies including at least one pair of relatively displaceable members;
    c. a container received between and supported on upper ends of the members of said assemblies;
    d. a hold-down device on an upper end of a first member of each of said assemblies engaging said container from above;
    e. a catch on an upper end of a second member of each of said assemblies releasably engaging said container, said container having lateral projections engaged by said catch, each catch comprising:
        $e_1$. a catch support on the upper end of said second member formed with an upwardly open cradle receiving the respective projection;
        $e_2$. a latch lever fulcrumed on said support and having a hook swingable to embrace the projection in the cradle in one sense and to clear the projection in the opposite sense;
        $e_3$. actuating means connected to said catch at a first tie point and to the first member at a second tie point for automatically swinging said latch lever in said other sense upon movement of said other tie point away from said catch; and
        $e_4$. a spring on said support biasing said catch lever in said one sense; and
    f. means for raising and lowering said assembly to vary the distance between each other tie point and the respective catch.

2. The combination defined in claim 1 wherein said container has a laterally projecting rim and said projections are support pins extending laterally from said container below said rim at a rear end of said container, said catches being provided on said assemblies at rear portions thereof and said hold-down devices being provided on said assemblies at front portions thereof with respect to a normal direction of movement of said vehicle, said first members each being provided with a roller engageable beneath said rim and co-operating with the respective hold-down device to retain the rim of the container between them.

3. The combination defined in claim 2 wherein said actuating means includes a flexible element interconnecting said tie points.

4. The combination defined in claim 3 wherein each of said catches further comprises a locking and actuating pawl pivotally mounted on the respective support and provided with the first tie point of the respective catch, each of said latch levers being of the double-arm type with the hook thereof forming one arm of the lever, each of said pawls having an entraining pin engageable with the other arm of the latch lever, said other arm of the latch lever having a first flank extending generally radially with respect to its fulcrum and engageable by said entraining pin upon tensioning of said element.

5. The combination defined in claim 4 wherein said other arm of each of said latch levers forms a control arm and is provided with a second flank engageable with said entraining pin and extending perpendicular to said first flank and directed toward the pivot of said pawl for retaining said latch lever in a position thereof adapted to embrace said support pin, said control arm of each latch lever being further provided with a third flank generally parallel to said first flank and engageable with said entraining pin for retaining said latch lever in an extreme position in said opposite sense against the force of said spring.

6. The combination defined in claim 3 wherein said pawl comprises a pair of plates flanking said latch lever and spacedly interconnected by said entraining pin.

7. The combination defined in claim 6 wherein said plates of said pawl flank said support plate.

8. The combination defined in claim 1 wherein said members of each assembly form a scissor linkage and are interconnected at a common pivot point for each assembly, said second tie point being formed on said first member of each assembly above the common pivot point of each assembly.

9. The combination defined in claim 8 wherein said element is a cable.

10. The combination defined in claim 3 wherein said hold-down device automatically receives said rim of said container and is shiftable from a position wherein it overlies said container into a position in which it clears said container.

* * * * *